(12) United States Patent
Costa et al.

(10) Patent No.: US 12,338,894 B2
(45) Date of Patent: Jun. 24, 2025

(54) TENSIONER WITH DUAL DAMPING SYSTEM FOR A BELT DRIVE

(71) Applicant: PROPULSION SOLUTIONS S.R..L., Ivrea (IT)

(72) Inventors: Edevon Costa, Indaiatuba (BR); Eduardo Souza, Indaiatuba (BR); Luca D'Amicantonio, San Bernardo d'Ivrea (IT); Antonio Gasper Junior, Indaiatuba (BR)

(73) Assignee: MUVIQ S.R.L., Ivrea (IT)

( * ) Notice: Subject to any disclaimer, the term of this patent is extended or adjusted under 35 U.S.C. 154(b) by 0 days.

(21) Appl. No.: 18/567,126

(22) PCT Filed: Jun. 3, 2022

(86) PCT No.: PCT/IB2022/055202
§ 371 (c)(1),
(2) Date: Dec. 5, 2023

(87) PCT Pub. No.: WO2022/259109
PCT Pub. Date: Dec. 15, 2022

(65) Prior Publication Data
US 2024/0263688 A1  Aug. 8, 2024

(30) Foreign Application Priority Data
Jun. 7, 2021  (IT) .................. 102021000014756

(51) Int. Cl.
*F16H 7/12* (2006.01)
*F16H 7/08* (2006.01)

(52) U.S. Cl.
CPC ..... *F16H 7/1218* (2013.01); *F16H 2007/081* (2013.01)

(58) Field of Classification Search
CPC ............ F16H 2007/081; F16H 7/1218; F16H 7/1209; F16H 7/1281; F16H 2007/084; F16H 2007/0893; F16H 7/0829
(Continued)

(56) References Cited

U.S. PATENT DOCUMENTS 4,285,676 A * 8/1981 Kraft .................... F16H 7/1281
267/155
4,583,962 A * 4/1986 Bytzek .................. F16H 7/1218
474/135
(Continued)

FOREIGN PATENT DOCUMENTS

EP        0709595 A1    5/1996

OTHER PUBLICATIONS

International Search Report and Written Opinion, Application No. PCT/IB2022/055202, Jul. 8, 2022, p. 1-11.
(Continued)

*Primary Examiner* — Henry Y Liu
(74) *Attorney, Agent, or Firm* — FisherBroyles, LLP; Susan M. Oiler

(57) ABSTRACT

A tensioner for a belt has a fixed part provided with a pivot defining an axis (A), an eccentric arm rotatably mounted on the pivot about the axis (A), a pulley rotatable about an axis (B) defined by the arm and configured to cooperate with a timing belt, a first spring-damper assembly interposed between the arm and the fixed part, and a second spring-damper assembly configured to act between the arm and the fixed part from a predetermined angle of rotation of the arm with respect to the fixed part.

10 Claims, 4 Drawing Sheets

(58) Field of Classification Search
USPC .................................................. 474/112, 135
See application file for complete search history.

(56) References Cited

U.S. PATENT DOCUMENTS

| | | | | |
|---|---|---|---|---|
| 4,634,407 A * | 1/1987 | Holtz | ................... | F16H 7/0848 |
| | | | | 474/112 |
| 4,822,322 A * | 4/1989 | Martin | ................... | F16H 7/129 |
| | | | | 474/135 |
| 4,826,471 A * | 5/1989 | Ushio | ................... | F16H 7/1281 |
| | | | | 474/135 |
| 4,832,665 A * | 5/1989 | Kadota | ................ | F16H 7/1227 |
| | | | | 474/112 |
| 4,834,694 A * | 5/1989 | Martin | ................... | F16H 7/129 |
| | | | | 474/135 |
| 4,917,655 A * | 4/1990 | Martin | ................... | F16H 7/1218 |
| | | | | 474/135 |
| 4,983,145 A * | 1/1991 | Hirai | ................... | F16H 7/1218 |
| | | | | 474/135 |
| 5,011,460 A * | 4/1991 | Ouchi | ................... | F16H 7/1245 |
| | | | | 474/135 |
| 5,195,932 A * | 3/1993 | Hirai | ................... | F16H 7/1218 |
| | | | | 474/135 |
| 5,620,385 A * | 4/1997 | Cascionale | ........... | F16H 7/1218 |
| | | | | 474/135 |
| 5,873,799 A * | 2/1999 | Meckstroth | ........... | F16H 7/1281 |
| | | | | 474/135 |
| 6,001,037 A * | 12/1999 | Rocca | ................... | F16H 7/1281 |
| | | | | 474/135 |
| 6,264,578 B1 * | 7/2001 | Ayukawa | .............. | F16H 7/1218 |
| | | | | 474/135 |
| 6,375,588 B1 * | 4/2002 | Frankowski | ........... | F16H 7/1227 |
| | | | | 474/135 |
| 6,464,604 B1 * | 10/2002 | Frankowski | ........... | F16H 7/1281 |
| | | | | 474/135 |
| 6,932,731 B2 * | 8/2005 | Kaiser | ................... | F16H 7/1218 |
| | | | | 474/135 |
| 7,507,172 B2 * | 3/2009 | Lehtovaara | ........... | F16H 7/1218 |
| | | | | 474/109 |
| 7,874,950 B2 * | 1/2011 | Lehtovaara | ........... | F16H 7/1281 |
| | | | | 474/135 |
| 7,951,030 B2 * | 5/2011 | Ward | ................... | F16H 7/1218 |
| | | | | 474/135 |
| 8,267,819 B2 * | 9/2012 | Lehtovaara | ............. | F16H 7/129 |
| | | | | 474/109 |
| 8,272,983 B2 * | 9/2012 | Rolando | ............... | F16H 7/1218 |
| | | | | 474/112 |
| 8,292,765 B2 * | 10/2012 | Rolando | ............... | F16H 7/1245 |
| | | | | 184/6.17 |
| 8,613,680 B2 * | 12/2013 | Frankowski | .......... | F16H 7/1218 |
| | | | | 474/135 |
| 8,641,564 B2 * | 2/2014 | Rolando | ............... | F16H 7/1281 |
| | | | | 474/112 |
| 8,690,718 B2 * | 4/2014 | Cantatore | ............. | F16H 7/1218 |
| | | | | 474/111 |
| 8,734,279 B2 * | 5/2014 | Ward | ................... | F16H 7/1218 |
| | | | | 474/135 |
| 8,926,462 B2 * | 1/2015 | Ward | ....................... | F16H 7/12 |
| | | | | 474/135 |
| 9,175,753 B2 * | 11/2015 | Frankowski | .......... | F16H 7/1245 |
| 9,212,731 B2 * | 12/2015 | Lindstrom | ............ | F16H 7/1218 |
| 9,464,697 B2 * | 10/2016 | Antchak | ................... | F16H 7/12 |
| 9,933,051 B2 * | 4/2018 | Bauerdick | ............. | F16H 7/0831 |
| 11,761,516 B2 * | 9/2023 | Grotto | ................. | F16M 11/126 |
| | | | | 474/112 |
| 2003/0017894 A1 * | 1/2003 | Kaiser | ................... | F16H 7/1218 |
| | | | | 474/112 |
| 2004/0185976 A1 * | 9/2004 | Meckstroth | ........... | F16H 7/1218 |
| | | | | 474/101 |
| 2006/0035740 A1 * | 2/2006 | Lehtovaara | ............. | F16H 7/129 |
| | | | | 474/237 |
| 2007/0249446 A1 * | 10/2007 | Hao | ...................... | F16H 7/1218 |
| | | | | 474/135 |
| 2008/0287233 A1 * | 11/2008 | Cantatore | ............. | F16H 7/1281 |
| | | | | 474/112 |
| 2010/0144473 A1 * | 6/2010 | Ward | ................... | F16H 7/1218 |
| | | | | 474/112 |
| 2010/0190594 A1 * | 7/2010 | Rolando | ............... | F16H 7/1281 |
| | | | | 474/112 |
| 2011/0045929 A1 * | 2/2011 | Rolando | ............... | F16H 7/1218 |
| | | | | 474/112 |
| 2011/0256969 A1 * | 10/2011 | Frankowski | .......... | F16H 7/1218 |
| | | | | 474/101 |
| 2012/0040789 A1 * | 2/2012 | Cantatore | ............. | F16H 7/1281 |
| | | | | 474/112 |
| 2012/0316018 A1 * | 12/2012 | Ward | ................... | F16H 7/1218 |
| | | | | 474/135 |
| 2012/0316019 A1 * | 12/2012 | Ward | ................... | F16H 7/1218 |
| | | | | 474/135 |
| 2014/0113755 A1 * | 4/2014 | Ward | ................... | F16H 7/1218 |
| | | | | 474/112 |
| 2014/0287859 A1 * | 9/2014 | Frankowski | .......... | F16H 7/1218 |
| | | | | 474/135 |
| 2014/0309882 A1 * | 10/2014 | Antchak | ................. | F02B 67/06 |
| | | | | 474/104 |
| 2015/0031485 A1 * | 1/2015 | Lindstrom | ............ | F16H 7/1218 |
| | | | | 474/135 |
| 2015/0119176 A1 * | 4/2015 | Ward | ................... | F16H 7/1281 |
| | | | | 474/112 |
| 2015/0362047 A1 * | 12/2015 | Barillet | ................. | F16H 7/1218 |
| | | | | 474/135 |
| 2016/0146313 A1 * | 5/2016 | Ma | ....................... | F16H 7/1218 |
| | | | | 474/135 |
| 2017/0023108 A1 * | 1/2017 | Bauerdick | ............. | F16H 7/0831 |
| 2018/0010671 A1 * | 1/2018 | Chen | ................... | F16H 7/0831 |

OTHER PUBLICATIONS

European Office Action, Application No. 22730620.6, Nov. 19, 2024, p. 1-5.

* cited by examiner

TENSIONER WITH DUAL DAMPING SYSTEM FOR A BELT DRIVE

CROSS-REFERENCE TO RELATED APPLICATIONS

The present invention is filed under 35 U.S.C. § 371 as the U.S. National Phase of International Patent Application No. PCT/IB2022/055202, filed Jun. 3, 2022, which designated the United States and which claims the benefit of Italian Patent Application No. 102021000014756, filed on Jun. 7, 2021, the entire disclosure of which is incorporated herein by reference.

TECHNICAL FIELD OF THE INVENTION

The present invention relates to a tensioner for a belt drive of a motor vehicle, in particular for a timing system.

STATE OF THE ART

Tensioners are known to comprise a fixed part provided with a pivot, a movable arm mounted on the pivot in a rotatable manner, and a pulley carried by the movable arm and intended to cooperate with the belt. In the case of a tensioner for a timing belt, the moving arm normally comprises an eccentric, pivot-mounted element which houses a spring. There is also a damping element interposed between the fixed part and the moving arm, typically defined by a bushing, so as to dampen the oscillations of the moving arm.

The "installation position" is defined as the maximum deviation of the arm from the belt, which can therefore be easily installed in this situation, and the "nominal position" as the static equilibrium of the tensioner under the action of the elastic force of the spring and the belt in nominal conditions.

Typically, tensioners damp vibration symmetrically, i.e. they exhibit a substantially equal hysteresis cycle during the loading and unloading phases of the tensioner. A limitation of such tensioners is the necessary presence of a certain angular distance between the nominal position and the installation position, in order to permit the belt installation. However, in some timing belt drives it is necessary, during operating conditions, to limit the angular displacement of the arm towards the installation position so as to keep it below a certain angle and prevent belt tooth jump. This may be achieved, in known tensioners, via a one-way clutch interposed between the arm and the fixed part of the tensioner. This brings about additional components.

The purpose of the present invention is to realize a tensioner that can overcome the above problems.

SUBJECT AND SUMMARY OF THE INVENTION

The above purpose is achieved by a tensioner as claimed in claim 1.

The tensioner according to the invention features a dual damping system, wherein the second non-symmetrical damping system provides a virtual stop to the arm after the nominal position in direction to the installation position. The tensioner allows the manual rotation of the arm until the installation position. However, during the engine operating conditions, it permits only a predetermined amount of arm angular displacement in direction opposite to the belt tensioning direction.

BRIEF DESCRIPTION OF THE DRAWINGS

For a better understanding of the present invention, a preferred form of implementation is described below, by way of non-limiting example and with reference to the accompanying drawings, wherein.

DETAILED DESCRIPTION OF PREFERRED EMBODIMENTS OF THE INVENTION

Figure 1:
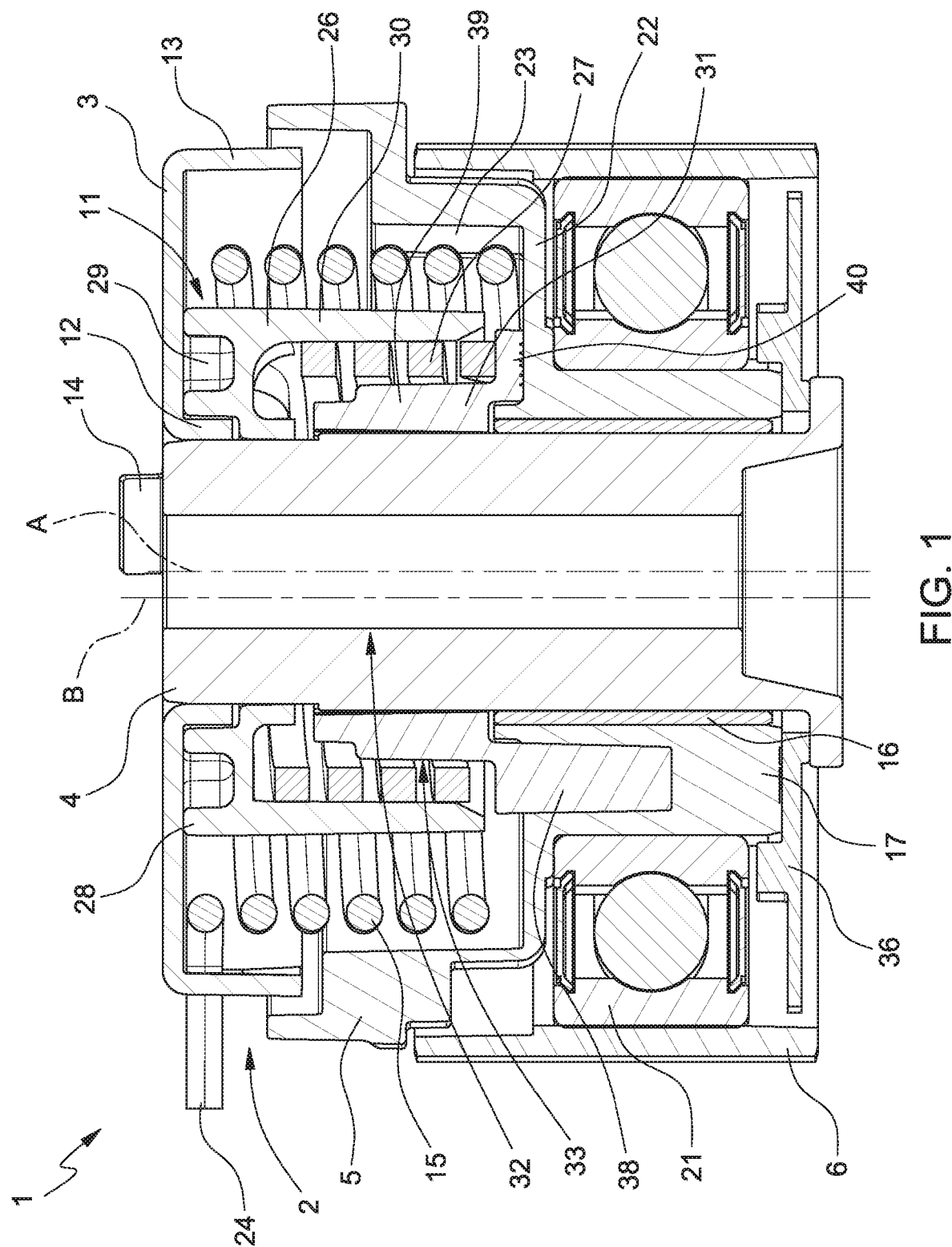
FIG. 1 is an axial sectional view of a tensioner according to the present invention.

With reference to FIG. 1, there is indicated by 1 a tensioner made according to the present invention and suitable for use in a timing system of an engine. The tensioner 1 includes a fixed part 2 provided with a base 3 and a pivot 4 fixed with respect to the base 3 and defining an axis A, an eccentric arm 5 rotatable about the pivot 4, and a pulley 6 rotatable about an axis B defined by the arm 5 and configured to cooperate with a timing belt (not shown).

The tensioner 1 further includes a first spring-damper assembly 7 and a second spring-damper assembly 11 interposed between the fixed part 2 and the arm 5, as will be further described below. In the present description, a "spring-damper assembly" is defined as an assembly comprising an elastic element, such as a spring, and a damping element, such as a bushing, acting jointly.

The base 3 is essentially an annular plate of axis A. The base 3 has, at an inner annular edge thereof, a first annular projection 12, and at an outer annular edge thereof, a second annular projection 13, extending in an axial direction. The pivot 4 is planted inside the first annular projection 12 and defines with the base 3 a fixed part 2 apt to be fixed to the engine by means of a screw of axis A (not illustrated) mounted through the pivot 4, and a projection 14 extending from the base 3 in an axial direction opposite to the projections 12, 13 and apt to engage with a seat obtained in the engine.

The first spring-damper assembly 7 includes a primary spring 15 interposed between the fixed part 2 and the arm 5, and a damping bushing 16.

The arm 5 includes an eccentric portion 17 rotatably mounted on an end portion of the pivot 4 opposite the base 3 via the damping bushing 16 and having an inner cylindrical A-axis surface in radial contact with the damping bushing 16 and an outer cylindrical B-axis lateral surface on which the pulley 6 is mounted by means of a bearing 21.

The arm 5 further includes a bell-shaped portion open to and facing the base 3, which is connected to the eccentric portion 17 by a radially annular intermediate wall 22. The bell-shaped portion bounds a chamber 23 with the base 3.

The primary spring 15 is a helical torsion spring, for example of circular cross-section, housed in the chamber 23 coaxially with the pivot 4 and axially interposed between the base 3 and the intermediate wall 22 of the arm 5. The primary spring 15 includes a first end 24 and a second end 25 directed radially. The first end 24 of the primary spring 15 engages in a radial through-seat 18 of the second annular projection 13 of the base 3. The second end 25 of the primary spring 15 engages a radial through-hole (not shown) of the bell-shaped portion of the arm 5.

The second spring-damper assembly 11 is housed in the chamber 23 axially between the base 3 and the intermediate wall 22 of the arm 5, and radially between the pivot 4 and the primary spring 15. The second spring-damper assembly 11 includes a fixed casing 26, a secondary spring 27, and a bushing 31.

The casing 26, forming part of the fixed part 2, is cup-shaped and includes an annular base portion 28 fitted on the pivot 4 and rigidly coupled to the base 3, for example by an axial projection 29 of the base 3 engaging a corresponding seat of the base portion of the casing 26, and an outer A-axis tubular wall 30 extending axially from the base portion toward the intermediate wall 22 of the arm 5. The casing 26 can be made of a variety of materials, for example, plastic material (possibly with an internal metal insert to increase mechanical strength), metallic material, or composite material.

The bushing 31 is a conical damping bushing mounted on the pivot 4 and comprising a conical wall 39 and an annular end flange 40 extending radially outward from the conical wall 39. The conical wall 39 has a radially inward surface 32 and a radially outward surface 33. The surface 32 is in radial contact with an intermediate portion of the pivot 4, and has a series of axial grooves 41. The surface 33 of the bushing 31 is substantially conical with a decreasing diameter from the flange 40 toward the base portion 28 of the casing 26, and adapted to interact with the secondary spring 27. The bushing 31 is axially cut along one of its generators so as to be radially flexible. On the side opposite the cut with respect to the axis A, the bushing 31 has an axial projection 38, preferably provided with an axial groove 42, which extends in the opposite direction with respect to the base 3 and is housed with angular clearance within a circumferential groove 44 of the arm 5.

The secondary spring 27 is a helical torsion spring, for example of rectangular cross-section, coaxial to the pivot 4 and mounted around the bushing 31, being radially interposed between the conical wall 39 of the bushing 31 and the tubular wall 30 of the casing 26. The secondary spring 27 includes a first end 34 and a second end 35 directed axially. The first end 34 of the secondary spring 27 engages an axially directed through-hole of the base portion 28 of the casing 26. The second end 35 of the secondary spring 27 engages an axial seat of the bushing 31, preferably in the axial groove 42 of the projection 38. The secondary spring 27 is mounted within the casing 26 with a radial preload.

The primary spring 15 exerts on the arm 5 such an elastic torque as to maintain the arm 5, in the absence of loads on the pulley 6, in a "free arm" position defined by the contact of the projection 38 of the bushing 31 with a first end 45 of the groove 44 of the arm 5 itself.

Figure 2:
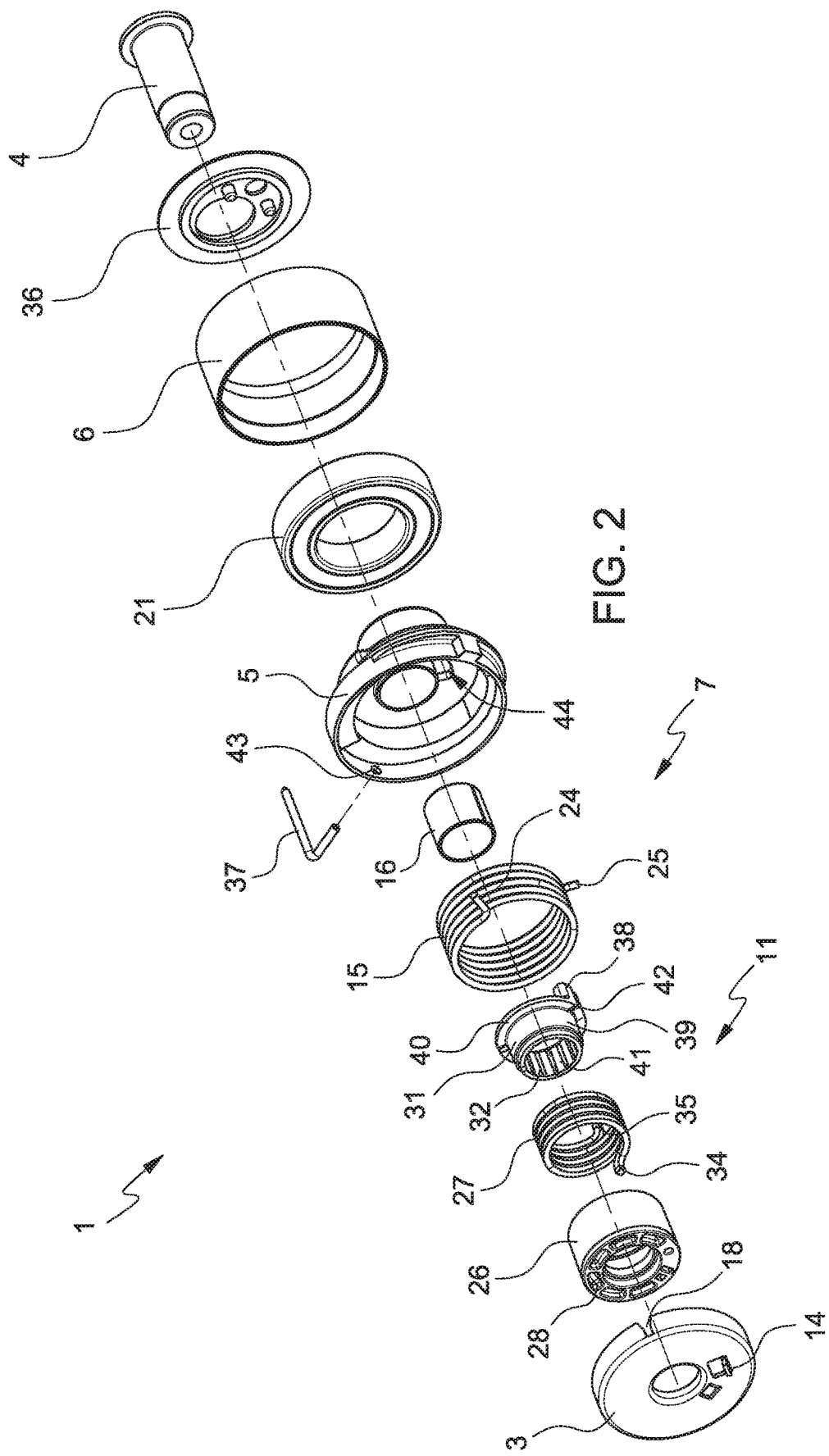
FIG. 2 is an exploded perspective view of the tensioner of FIG. 1.

The tensioner 1 (FIG. 2) further includes a lock-up pin 37 for locking the arm 5 in an installation position rotated with respect to the "free arm" position against the spring action of the primary spring 15 and the secondary spring 27, as will be better described below. The lock-up pin 37 is housed in a radial through-hole 43 of arm 5 and holds arm 5 in a fixed relative position with respect to base 3 in an installation configuration of the tensioner 1.

Finally, the tensioner 1 includes a dust-cover disc 36 interposed axially between an end of the arm 5 and a head of the pivot 4, and extending radially so as to protect the bearing 21.

Figure 3:
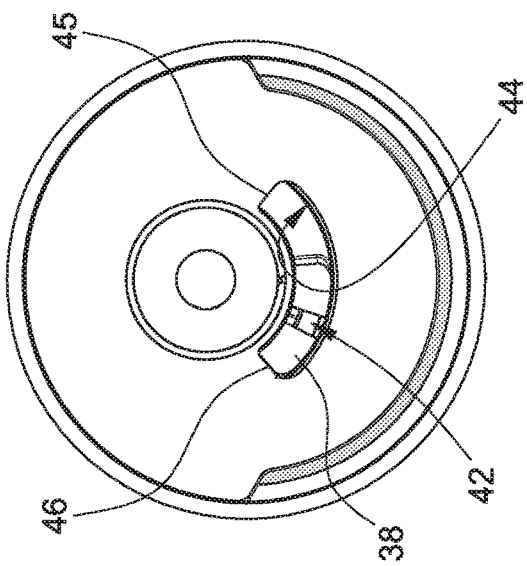
FIGS. 3, 4, 5 are partial sectional views of the tensioner of FIG. 1 in various operating positions.

The operation of the tensioner 1 is described starting from the "free arm" position defined, as mentioned above, by the contact of the projection 38 of the bushing 31 with the first end 45 of the groove 43 (FIG. 3).

As the belt load increases, the arm 5 rotates, against the reaction torque of the primary spring 15, toward the installation position. The connection with angular clearance between the arm 5 and the bushing 31 is such that in a first part of the rotational movement of the arm 5 (section a in the graph of FIG. 6), only the first spring-damping assembly 7 intervenes. In particular, the primary spring 15 acts, whose elastic deformation increases with the increase of the relative angle according to a linear relation, with a first slope defined by the stiffness of the primary spring 15.

Figure 4:
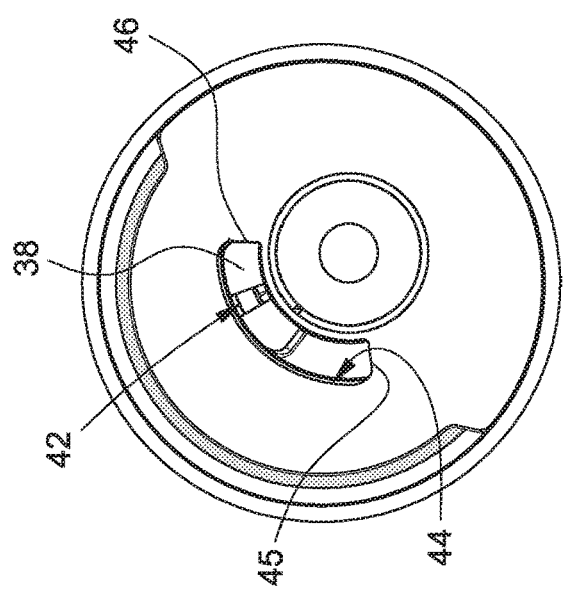

Upon reaching a predetermined angle, dependent on the angular width of the groove 44, the arm 5 comes to hit tangentially against the projection 38 of the bushing 31 with a second end 46 of the groove 44 (FIG. 4). The stiffness of the primary spring 15 may be chosen such that this condition coincides with a nominal position of the tensioner 1, determined by balancing the actions exerted by the primary spring 15 and the belt in nominal conditions.

From this position, as the belt load increases, the second spring-damper assembly 11 also acts. In particular, the secondary spring 27, of greater stiffness than the primary spring 15, acts too. Since the secondary spring 27 is preloaded and it is necessary to overcome this preload, the graph (FIG. 6) presents a second section b with an initially very high slope that progressively decreases with the increase in the number of coils which, while contracting, detach themselves from the tubular wall 30, and therefore with the increase in the free length of deformation of the secondary spring 27, until a condition of complete detachment of the secondary spring 27 from the tubular wall 30.

At a further increase in the relative angle, the bushing 31 rotates against the action of both springs 15, 27. The graph (FIG. 6) therefore presents a third section c with a slope defined by the sum of the stiffnesses of the two springs 15, 27 acting jointly in parallel.

During its own contraction, the secondary spring 27 progressively and smoothly wraps around the bushing 31, creating radial contact one coil after the other. Due to its axial cut, the bushing 31 in turn progressively tightens on the pivot 4. Therefore, a proportional radial damping is realized between the bushing 31 and the pivot 4.

Having described the behaviour of the tensioner 1 as a function of the load exerted by the belt, it is now appropriate to describe its actual behaviour in use.

Figure 5:
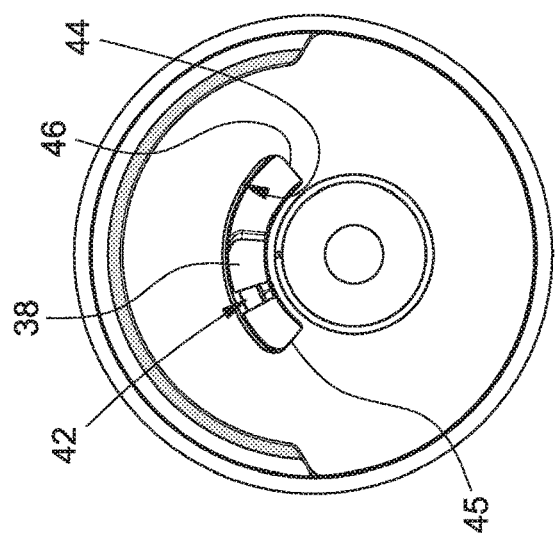

In particular, the installation of the tensioner 1 on the engine takes place in the installation position (FIG. 5), held stable by the lock-up pin 37.

After installation of the belt, the lock-up pin 37 is pulled out and the arm 5, under the action of the springs 15, 27, moves to its nominal position (FIG. 4).

Under dynamic conditions, during engine operation, the two spring-damper assemblies 7, 11 realize an asymmetric damping of the motion of the arm 5 depending on the direction of such motion from the nominal position.

In particular, when the arm 5 rotates towards the "free arm" position, only the first spring-damper assembly 7 intervenes and therefore the damping is determined solely by the damping bushing 16. Instead, when the arm 5 rotates towards the installation position, the second spring-damper assembly 11 also intervenes, thus resulting in an increase in both the elastic stiffness and the damping acting on the arm 5.

Figure 6:
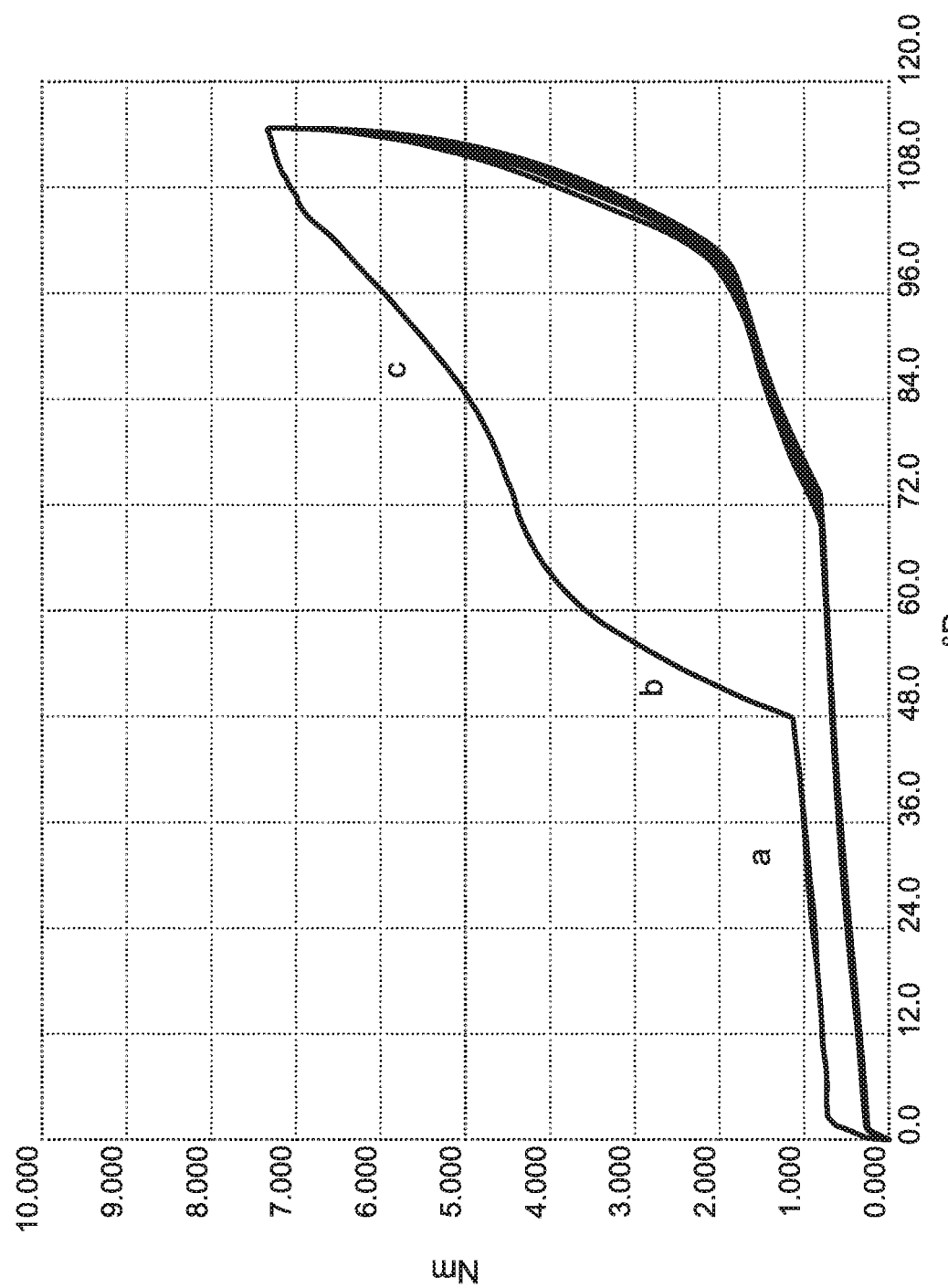
FIG. 6 is a graph representing the torque of the tensioner as a function of the angle of rotation of a tensioner arm.

The asymmetric damping is evident with reference to FIG. 6, wherein the curve shows different hysteresis levels resulting from the different dampings described above.

Upon examination of the characteristics of the tensioner 1, the advantages of the present invention are clear.

In particular, the tensioner 1 dampens the vibrations of the arm 5 asymmetrically. This is possible thanks to the second spring-damper assembly 11, which creates a region with high stiffness and damping due to the combination of the preloaded secondary spring 27 and the bushing 31.

Furthermore, the preload of the secondary spring 27 is controlled by the casing 26. For the same secondary spring 27, the smaller the diameter of the tubular wall 30 of the casing 26, the smaller the outer diameter of the secondary spring 27 and thus the greater its preload. Therefore, the preload of the secondary spring 27 can be easily controlled by a convenient choice of the diameter of the casing 26 or of the number of coils of the secondary spring 27.

This allows to use (and thus make) fewer components with respect to a tensioner having a one-way clutch.

In addition, during movement of the tensioner 1 from the nominal to the installation position, the tensioner 1 absorbs most of the energy from the belt due to the resistant torque created by the secondary spring 27. In this way, less energy will remain to be damped by the friction of the bushing 31 into the pivot 4, reducing the wear of the bushing 31 and improving its life. This is advantageous with respect to known one-way clutch systems that dampen the movement by friction and not by a spring reaction torque, since the spring in a one-way clutch is not pre-loaded.

Furthermore, another advantage is that the secondary spring 27 with higher stiffness cooperates with the primary spring 15 when the tensioner 1 is in the installation position or any position in the range between the installation position and the nominal position and the belt load stops acting. This allows to increase the movement acceleration so as to make the tensioner 1 return to the nominal position faster when compared with a one-way clutch system. In this condition, the one-way clutch would stop acting, since it would only release the contact between the pivot and bushing and only the primary spring would drive the tensioner from the installation position to the nominal position.

Finally, it is clear that modifications and variations can be made to the tensioner 1 without going beyond the scope of protection defined by the claims.

For example, the primary spring 15 may not be circular in cross-section and/or the secondary spring 27 may not be rectangular in cross-section and be e.g. circular.

Further, the secondary spring 27 may be of such high stiffness that it achieves its purpose without needing to be preloaded or may have a different number of coils.

The invention claimed is:

1. A tensioner comprising:
a fixed part provided with a pivot tube defining an axis (A),
an eccentric arm rotatably mounted on the pivot tube about the axis (A),
a pulley rotatable about an axis (B) defined by the arm and configured to cooperate with a timing belt,
a first spring-damper assembly interposed between the arm and the fixed part, and
a second spring-damper assembly configured to act between the arm and the fixed part from a predetermined angle of rotation of the arm with respect to the fixed part, wherein the second spring-damper assembly comprises:
a bushing rotatably mounted on the pivot tube about the axis (A),
a spring coaxial to the pivot tube having a first end constrained to the fixed part and a second end constrained to the bushing, the spring acting torsionally between the fixed part and the bushing,
wherein the arm and the bushing are connected to each other with angular clearance.

2. The tensioner as claimed in claim 1, wherein the spring is mounted between the fixed part and the bushing with a preload.

3. The tensioner as claimed in claim 1, wherein the fixed part comprises a base attached to the pivot tube and a tubular casing coaxial to the pivot tube and attached to the base.

4. The tensioner as claimed in claim 1, wherein the bushing exerts a radial damping action on the pivot tube.

5. The tensioner as claimed in claim 4, wherein the bushing is axially cut along a generator thereof.

6. The tensioner as claimed in claim 3, wherein the spring is a helical spring mounted with radial interference inside the tubular casing.

7. The tensioner as claimed in claim 6, wherein the spring has axially directed ends constrained to the fixed part and the bushing, respectively.

8. The tensioner as claimed in claim 6, wherein the spring has a rectangular or circular cross section.

9. A tensioner comprising:
a fixed part having a base with a pivot tube defining a first axis (A) and a tubular casing coaxial to the pivot tube,
an eccentric arm rotatably mounted on the pivot tube and defining a second axis (B),
a pulley rotatable about the second axis (B) and configured to cooperate with a timing belt,
a first spring-damper assembly interposed between the eccentric arm and the fixed part, and
a second spring-damper assembly configured to act between the eccentric arm and the fixed part from a predetermined angle of rotation of the arm with respect to the fixed part, the second spring-damper assembly comprising:
a bushing rotatably mounted on the pivot tube about the first axis (A),
a helical spring mounted with radial interference inside the tubular casing of the fixed part, the spring acting torsionally between the fixed part and the bushing,
wherein the bushing has a conical outer surface suitable for interacting with the spring.

10. A tensioner comprising:
a fixed part provided with a pivot tube defining an axis (A),
an eccentric arm rotatably mounted on the pivot tube about the axis (A),
a pulley rotatable about an axis (B) defined by the arm and configured to cooperate with a timing belt,
a first spring-damper assembly interposed between the arm and the fixed part, and
a second spring-damper assembly configured to act between the arm and the fixed part from a predetermined angle of rotation of the arm with respect to the fixed part, wherein the second spring-damper assembly comprises:
a bushing rotatably mounted on the pivot tube about the axis (A),
a spring coaxial to the pivot tube having a first end constrained to the fixed part and a second end constrained to the bushing, the spring acting torsionally between the fixed part and the bushing,
wherein the arm and the bushing are connected to each other with angular clearance,
wherein the connection with angular clearance between the bushing and the arm is defined by at least one projection extending from one between the bushing and the arm and engaging with lost motion a circumferential seat obtained in another between the bushing and the arm.

* * * * *